INVENTORS
AUGUST C. SIEFERT
CHARLES J. STALEGO
BY
ATTYS.

Fig-8

United States Patent Office 2,921,342
Patented Jan. 19, 1960

2,921,342

METHODS FOR PRODUCING FIBROUS GLASS

August C. Siefert and Charles J. Stalego, Newark, Ohio, assignors to Owens-Corning Fiberglas Corporation, a corporation of Delaware Application February 14, 1955, Serial No. 487,824

3 Claims. (Cl. 18—47.3)

This invention relates to the manufacture of fibrous glass and film glass and particularly to methods for producing glass having greatly improved properties. This invention more specifically relates to methods of forming drawn out glass particles, drawn out glass particles denoting continuous fibers, staple fibers, short fibers, chopped fibers, curled fibers, film glass, flake glass and small spherical forms of glass.

It is an object of this invention to produce uniform quality, slug-free, fine diameter fibers.

It is a further object to increase production rates in processes involving the manufacture of film and fibrous glass.

It is an object to utilize more efficiently the attenuating forces available in existing and proposed fiber and film glass production methods.

It is an object to control the atmosphere in the attenuating zone of glass manufacturing installations.

It is a further object to provide a suitable atmosphere in the forming zone of any fiber or film glass making process to improve the physical properties of the products of the process.

It is an object to stabilize fiber and film forming processes.

It is an object to produce finer diameter fibers at greatly increased production rates.

It is an object to produce glass articles of uniform dimension.

Further objects will be apparent from the description which follows.

It has been discovered that it is very advantageous to work glass while in the plastic state in an atmosphere of a substance which controls the surface tension and viscosity of the glass or that the surface tension of the glass to be drawn out be controlled by adding a substance to the surface of the glass before attenuation. The surface tension may be increased or decreased as may be necessary; however, generally it is desirable to reduce surface tension while working the glass.

It is desirable to control surface tension when working gobs of glass into flat sheets or into molded products such as bottles or the like. The advantages of controlling surface tension of the glass to be worked are even greater in processes involving formation of fiber and film glass or other particle forms from a molten bath of glass. For instance, by reducing the surface tension of glass being attenuated into fibers by the action of a blast of combustion products or of a fluid such as steam, air or water, the tendency for the glass to pull into spherical shapes or "shot" is reduced. The reduction of "shot" content in the fibrous product provides higher quality and better insulating performance. If the product is an insulating bat, the absence of "shot" and the increase of uniformity of fiber diameter improves the thermal insulating value of the product. Fibers having increased length, finer diameter, and more uniform diameters are produced by the methods utilizing a blast of combustion products from a burner or air from a nozzle or attenuation. These long fibers catch any random short fibers and fly and integrate them into the product. When producing continuous fibers and staple fiber, it is possible to produce higher quality products by the use of this invention. Continuous fiber of more uniform and very fine diameter is produced for greater lengths of time. Staple fibers of greater length and having smoother surfaces are produced. In centrifugal forming processes which normally produce quite long fibers, it is advantageous to use the methods of this invention to improve the product by increasing fiber length, to add stability to the process, and increase production rates. Film glass forming methods are stabilized by introducing an atmosphere of a substance which controls surface tension thereby improving both process and the product.

In another embodiment of the invention a surface tension controlling substance is introduced into the molten glass to be worked.

The invention will be better understood by reference to the drawings, in which.

Figures 1, 2:
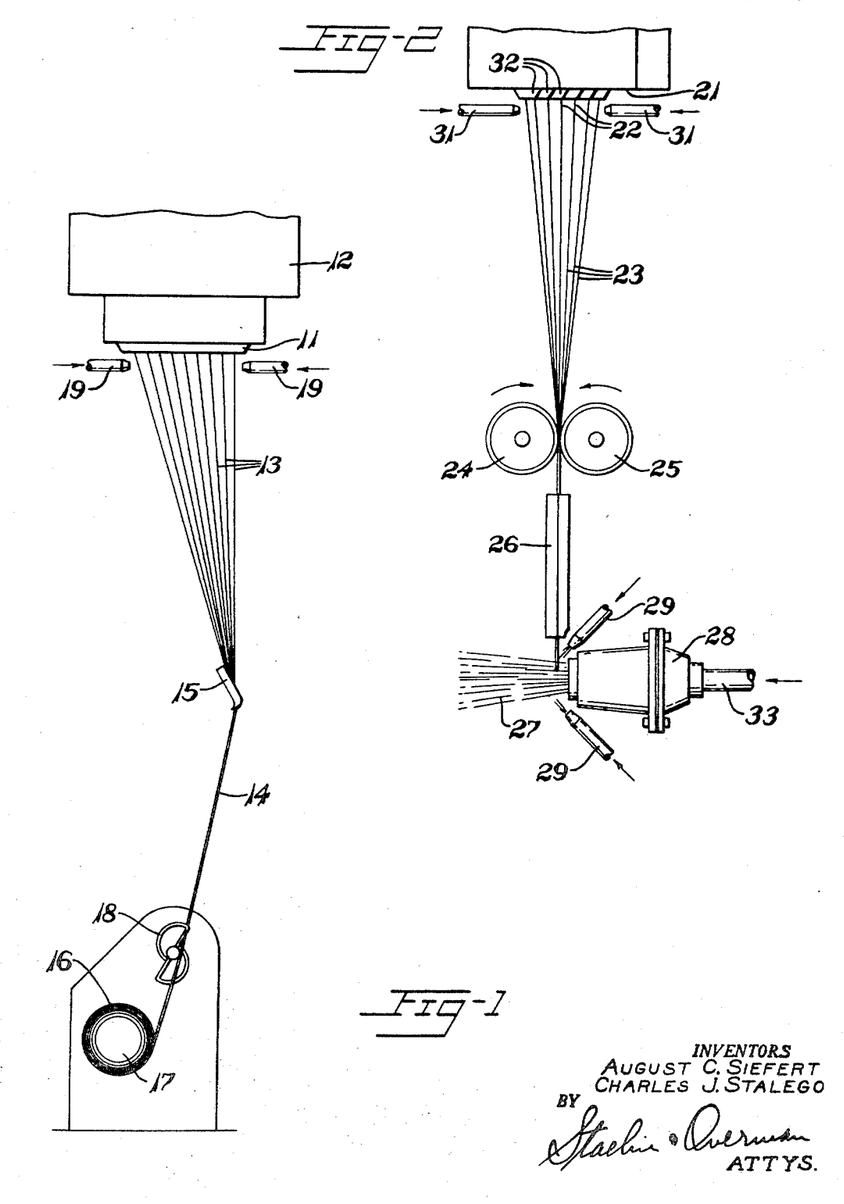
Figure 1 is an elevational view of apparatus for producing continuous fibers.
Figure 2 is an elevational view of apparatus for blowing fibers by the use of a burner blast.

In Figure 1 is shown apparatus for forming continuous fibers such as those used in textile products. A feeder 11 is shown disposed below a source of molten glass 12. Feeder 11 is provided with a plurality of orifices disposed in individual nipples, not shown. The orifices need not be positioned within nipples however. For instance, the orifices are sometimes disposed in the vertex of a V bushing or they are disposed in a flat plate comprising a nonwetting alloy such as a gold-platinum alloy. The individual fibers 13, 13 emitting from the orifices are gathered together in the form of a strand 14 by gathering device 15. The strand 14 is wound into a package 16 on a paper or polyethylene tube which is slipped over collet 17. Spiral wire traverse device 18 which rotates and traverses along its longitudinal axis forms successive loops of helical form upon the collet 17.

Tubes for introducing a fluid which controls the surface tension of the glass while in a molten state are indicated by numeral 19. When operating the apparatus shown in Figure 1, molten glass is flowed through the feeder 11, which may be heated by electrical means, and as the glass beads down and flows from the feeder, the fibers are pulled downwardly by hand and gathered together upon gathering device 15. The strand 14 is then pulled downwardly and wrapped about collet 17 as the collet is started to rotate. The strand is started at the edge of the collet and after the collet is up to speed the strand is placed into a position where it will be acted upon by the spiral wire traverse device 18. A fluid which affects the surface tension of the glass is introduced through tubes 19, 19 to provide an atmosphere about the fibers as they are being attenuated. The attenuation zone is immediately below the feeder 11 and although the attenuating forces are transmitted all the way from the collect 17 to the feeder 11, the actual attenuation of the glass takes place immediately after the glass leaves feeder 11. The attenuating zone is believed to include the first five or six inches below the feeder or perhaps even less distance, i.e., the first two or three inches below the feeder.

In Figure 2 is shown apparatus for producing fibrous glass by the use of a blast of combustion gases. The apparatus comprises a feeder 21 for feeding a plurality of streams 22 of molten glass that are attenuated into glass filaments 23, 23 by coacting rollers 24, 25 driven by any suitable means. The filaments emerging from between the rollers pass through grooves in vertical guide 26 which maintains the filaments in the desired paths and in a spaced apart relationship.

The filaments, which are sometimes referred to as primary fibers, emit from the guide 26 and are directed into a high speed gaseous blast 27 generated by burner 28. The gaseous blast is in a path that is substantially at a right angle to the direction of feed of the filaments into the blast. The blast is intensely hot so that as the filaments move into the blast they are melted and the molten glass is drawn out by the force of the blast into fine glass fibers. The fibers are borne by the blast to a suitable collecting means, not shown, which collecting means comprises a device such as a foraminous conveyor having associated therewith a suction box for forming a pack upon the conveyor. The fibers from this process are generally collected in the form of mat. Nozzles 29, 29 for directing a fluid that controls surface tension of the molten glass into the attenuation zone adjacent burner 28 are provided as shown. In addition, optional tubes 31, 31 are disposed adjacent to the individual tips 32, 32 of feeder 21.

Burner 28 has an inlet 33 for the introduction of gas-air mixture into the combustion chamber. A fluid which controls the surface tension of the glass as it emits from the feeder 21 helps stabilize the process and tends to produce a finer primary fiber which is then introduced into the gaseous blast emitting from burner 28. The introduction of a substance through tubes 31, 31 is optional and the introduction of a substance at the burner has much more effect in improving physical properties of the product. The introduction of a fluid to control surface tension of the glass which becomes molten in the gaseous blast is very effective in helping to produce very fine diameter fibers with such a process as that shown in Figure 2. A gaseous substance is added to the gas-air mixture introduced through inlet 33 to control the surface tension of the glass being attenuated by the gaseous blast 27 in a preferred embodiment. Any of the means for introducing a fluid that controls surface tension of the glass may be used alone or in combination with the other means of introducing fluid. A high quality, fine diameter fiber insulating product is produced by this process. Production rates are increased and the amount of burner gas required to produce the same amount of fiber is reduced.

Figure 3:
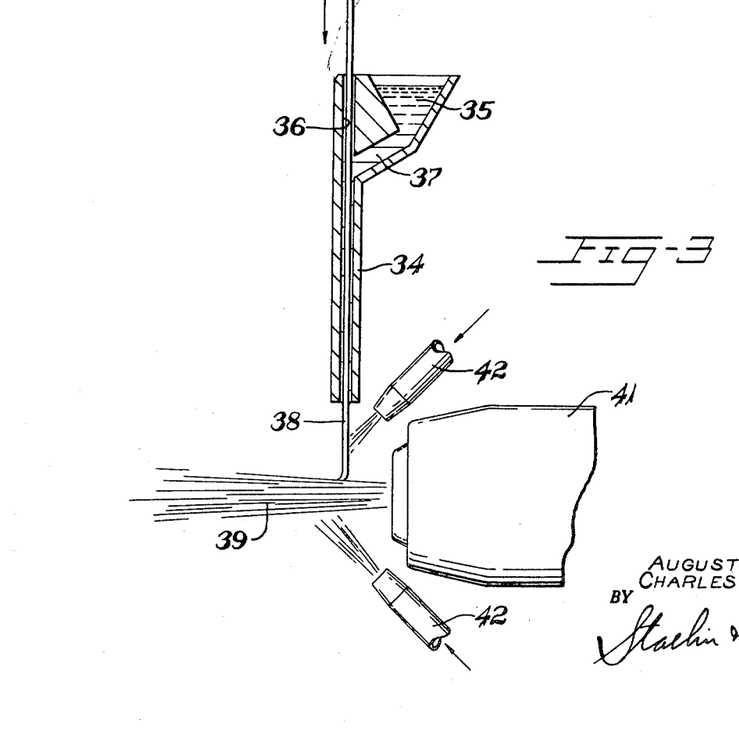
Figure 3 is a view, partly in section, of modified apparatus of Figure 2.

In Figure 3 is shown a modified vertical guide 34, the guide being in section and comprising a reservoir 35 connected to the slot 36 through port 37. The primary fiber 38 which has been treated is directed into the gaseous blast 39 produced by burner 41. The treating solutions or dispersions which can be used with the guide 34 include those of metal salts such as sodium or potassium salts and including fluorides, sulfates, chlorides and the like. By coating the primary fiber 38 with a film of a liquid such as a solution of a fluoride, chloride or sulfate, it is possible to add an acid anion to the glass and thereby produce a product which counteracts alkali that may be collected on the fibrous glass product while it is in use. Alkali attack is a serious enemy of fibrous glass products and by counteracting the alkali it is possible to protect the fibrous glass mat and extend its useful life. In addition, the salt, and especially the sulfates and fluorides when added, act as a flux and reduce surface tension and viscosity so that finer diameter fiber in larger quantities is produced.

The coating for the primary fiber 38 may be in the form of a solution, a paste or the like. Water and then a powder is applied to the primary fiber as an alternate method. Combinations of salts in solution or dispersion form may be used. For instance, ammonium sulfate and sodium fluoride in solution are used satisfactorily. Fluorides are sometimes added to the batch itself in order to provide a reduction in surface tension and viscosity of the molten glass produced by melting the batch; however, such an expedient results in refractory attack. Most of the fluorine added to the batch is lost by volatilization during melting of the batch and therefore has no effect during attenuation.

When a fluid is introduced into the gaseous blast 27 or 39 either through nozzles 29 or 42 or into the gas-air mixture going into the burner, it has been found that the proportion of fluid introduced is preferably from about 0.01 to 5% by volume of the total combustion gases. Gaseous substances are introduced so that the added gas is from 0.01 to 0.03% by volume of the combustion gases in a preferred embodiment of the invention. Combustion gases include the gas and the air in the gas-air mixture introduced into the burner.

In an effort to increase the surface tension of the glass, an aluminum salt is introduced upon the primary fiber with the apparatus of Figure 3. A salt of aluminum such as aluminum chloride is introduced in the form of a solution upon the glass surface and the salt is oxidized in the burner blast to form aluminum oxide on the glass surfaces.

Figure 4:
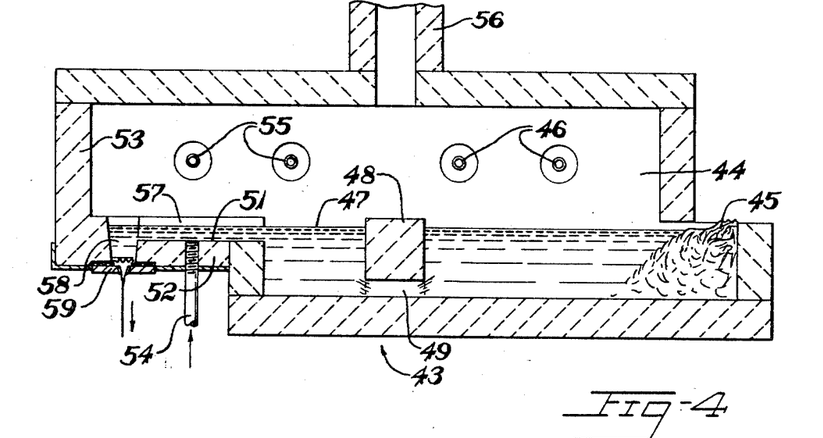
Figure 4 is a cross-sectional view of a glass tank and forehearth.

In Figure 4 is shown a cross-section of a glass furnace 43 comprising a melting compartment 44 into which the batch of raw material is introduced at a dog house 45, the material being melted by means of burners 46, 46. The furnace also comprises a refining compartment or chamber 47 separated from the melting chamber by a wall 48, these chambers communicating through a throat or passageway 49. The glass from the refining compartment flows into a forehearth extension 51 comprising a floor 52 and a front wall 53. An inlet tube 54 provides a passage through floor 52 for the introduction of a fluid such as a gas which bubbles through the glass as it passes through forehearth extension 51. Burners 55, 55 are provided for raising the temperature of the glass within the forehearth. A stack 56 is provided through which the spent gases are conducted from the furnace. The glass flows forward from refining compartment 47 through a channel 57 in the floor 52 and into a well 58 extending downward through floor 52. A feeder 59 is provided at the bottom of well 58.

By the use of a furnace such as that shown in Figure 4, it is possible to introduce materials into the molten glass which is to be drawn out into particle form, which materials control the surface tension of the molten glass making it possible to control the drawing out processes and improve the physical properties of the fibers so produced. An added advantage is gained by bubbling in that the glass is homogenized by the bubbling action.

Adding a fluid which affects the surface tension and viscosity of the glass immediately prior to the drawing of the glass precludes removal of the fluid from the glass by volatilization as occurs when materials are added to the batch ingredients.

Figure 5:
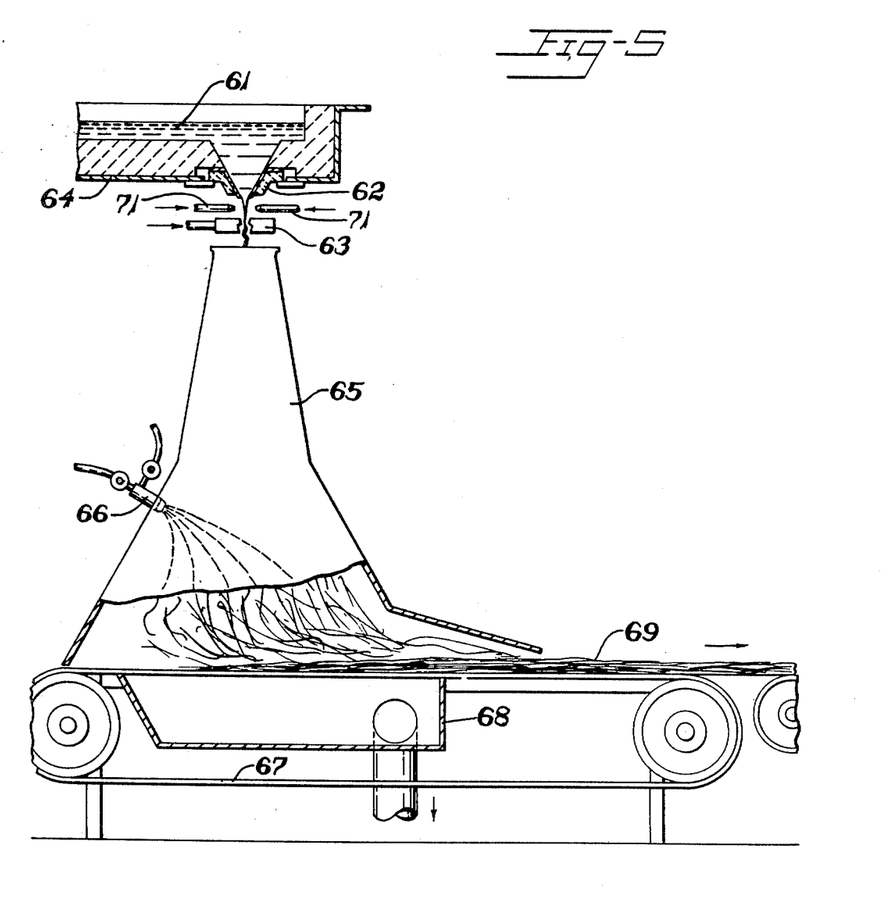
Figure 5 is a side elevational view, partly in section, of a process for forming insulating bats, which process utilizes a fluid as the attenuating force.

In Figure 5 is shown apparatus for producing fibers adapted for forming bats of insulating material and bonded mat, the process utilizing the attenuating force supplied by a fluid such as steam or air. A supply of molten glass 61 is introduced into a feeder 62 to provide a plurality of streams of molten glass which are directed downwardly into a blower 63 into which is introduced a fluid such as steam. The molten glass is contained in a melting device or in a forehearth 64 as shown. The fiber forming apparatus includes a hood 65, a spraying device for applying binder 66, and link conveyor 67 with an associated suction box 68. The fibers attenuated by the blast of steam, air or other fluid are collected upon the link conveyor in the form of a bat 69.

A fluid which affects the surface tension of the molten glass is introduced through tubes 71, 71 or as an alternative method the fluid is mixed with the steam or air that is directed into blower 63. Such added fluid for controlling surface tension of the glass being attenuated is added in proportions of up to 0.03% of the total steam and induced air being directed down through hood 65. Very small proportions of such fluids are effective in controlling the surface tension of the glass.

Figure 6:
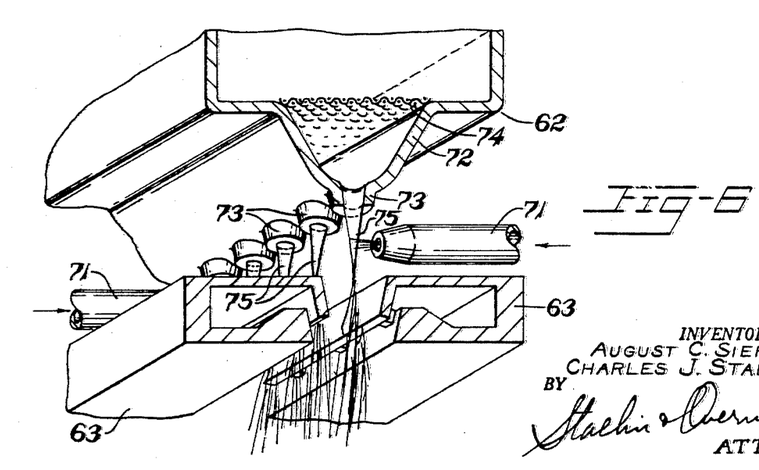
Figure 6 is a perspective view of a steam blower and glass feeder sometimes used in apparatus shown in Figure 5.

In Figure 6 is shown a perspective view, partly in section, of the feeder and blower. The feeder 62 comprises a generally V-shaped section 72 at the vertex of which are disposed a plurality of tips 73, 73. A screen 74 is disposed above the V-section member to homogenize the molten glass flowing through feeder 62. A pair of blowers 63, 63 are disposed on opposite sides of the streams of molten glass 75, 75 emitting from tips 73, 73. The blasts of steam from blowers 63, 63 are directed downwardly and in slightly converging paths so as to attenuate the glass streams into fine diameter fibers.

Figure 7:
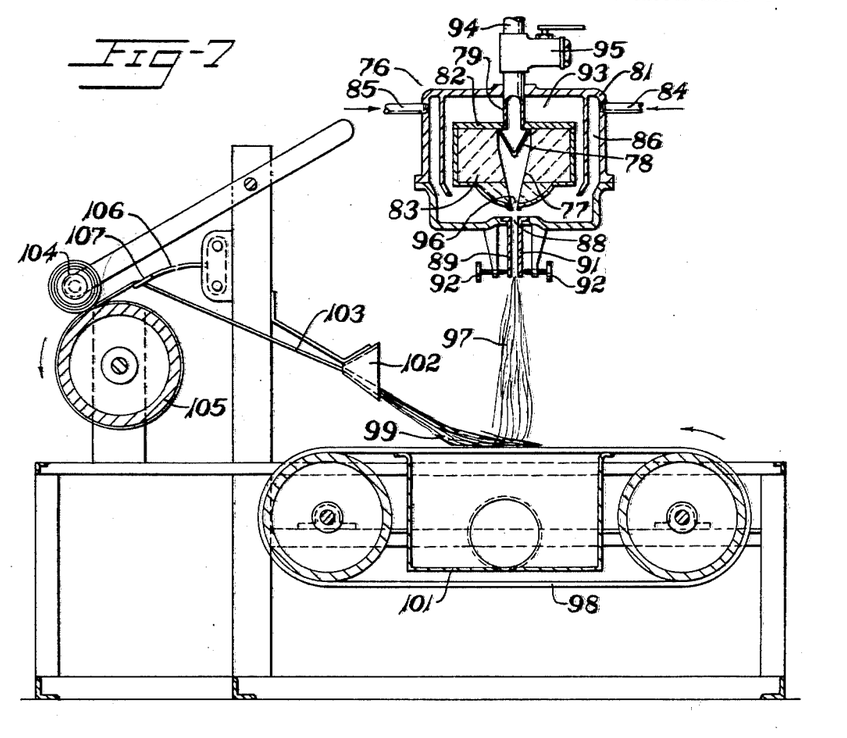
Figure 7 is a side elevational view of a staple fiber forming process.

In Figure 7 is shown apparatus for producing staple fiber by a preferred method. Parts of this apparatus are disclosed in United States Patent 2,286,903, issued to Dockerty on June 16, 1942. Low pressure air is utilized in this process to attenuate streams of molten glass into discontinuous fibers of the desired length. The apparatus comprises a melter and blower 76. The melter and blower comprises a platinum alloy melter 77 having a perforated metal plate 78 disposed therein. Disposed above the melter 77 is an inlet pipe 79 adapted for introduction of glass marbles into the melter. The melter is secured within double walled housing 81 by means of a frame 82. About the melter are disposed refractory blocks 83, 83. Air is introduced into the melter and blower through inlets 84 and 85 and this air passes downwardly through air chambers 86, 87 and exhausts through outlet 88. The exhausting air then goes down through the passage formed by shields 89 and 91. Shields 89 and 91 are adjustable laterally so that the passageway can be made wider or narrower as desired. The adjusting means is indicated by numerals 92, 92.

The air introduced through inlets 84 and 85 leads back into the chamber 93 above melter 77. The melter and inlet pipe 79 are not sealed with respect to one another so that the air is free to travel into the melter and exerts pressure upon the surface of the molten glass within melter 77. The marble inlet tube 94 is connected to a hopper for marbles, not shown. The marble hopper is sealed to the air and maintained under pressure substantially equal to the pressure maintained within melter and blower 76. When reloading, the hopper air valve 95 is opened to prevent air pressure from blowing the marbles which are in the tube 94 back toward the marble hopper through inlet tube 94. Normally the marble hopper is sealed to the atmosphere and the marbles fall by gravity into melter 77, the introduction rate of the marbles being controlled by a suitable means.

A fluid is introduced along with the air through inlets 84 and 85 to control the surface tension of the molten glass emitting from orifices 96 disposed in melter 77. For instance, a gaseous substance is mixed with the air and then introduced through the blower in order to reduce the surface tension of the molten glass being attenuated. In addition or as an alternative, the surface tension controlling fluid is introduced at the lower end of shields 89, 91 through nozzles.

The fibers 97 pass downwardly toward link belt conveyor 98 and are collected thereon in the form of a veil 99. The conveyor is provided with a suction box 101 which helps form the veil 99 of fibers. The conveyor is sometimes replaced with a large diameter drum which is evacuated. The veil 99 of fibers is drafted off the link belt conveyor and passed through a funnel-shaped guide 102 to form a strand or sliver 103 which is wound on spool 104. The suction exerted upon the fibers at the conveyor 98 makes it necessary to exert substantial force in drafting the fibers therefrom. The drafting of the fibers operates to comb the fibers so that they are straightened out as they approach the funnel guide and thereby form a sliver in which the fibers are substantially parallel. Owing to the great length of the individual fibers, which are in effect substantially continuous in the form of sliver, any given length of the sliver which may be placed under tension in the usual manufacturing operations which follow possesses great tensile strength. Tensile strength of the slivers is ample to permit weaving, knitting or textile operations thus obviating the necessity of twisting the strand to give it strength.

If desirable, an air turbine is used in place of the funnel-shaped guide to wrap in any loose fibers and to form an integral sliver. A rollup device is used in conjunction with the air turbine to package the staple product.

Spool 104 is held by gravity against the face of winding drum 105, the latter being driven by an electric motor. The sliver is evenly distributed on the spool 104 by means of a distributing arm 106 which is provided at its forward end with a guiding loop 107.

Fibers of increased length are produced by the introduction of a gas into the air used for attenuating the fibers and a staple product of improved quality is provided. The longer fibers make it possible to draft the product to a greater degree with the result that even more parallelism of the fibers within the sliver is obtained. The integrity of the sliver is improved which makes it possible to carry out subsequent textile operations with greater ease at the same time that a product of improved quality is produced.

Figure 8:
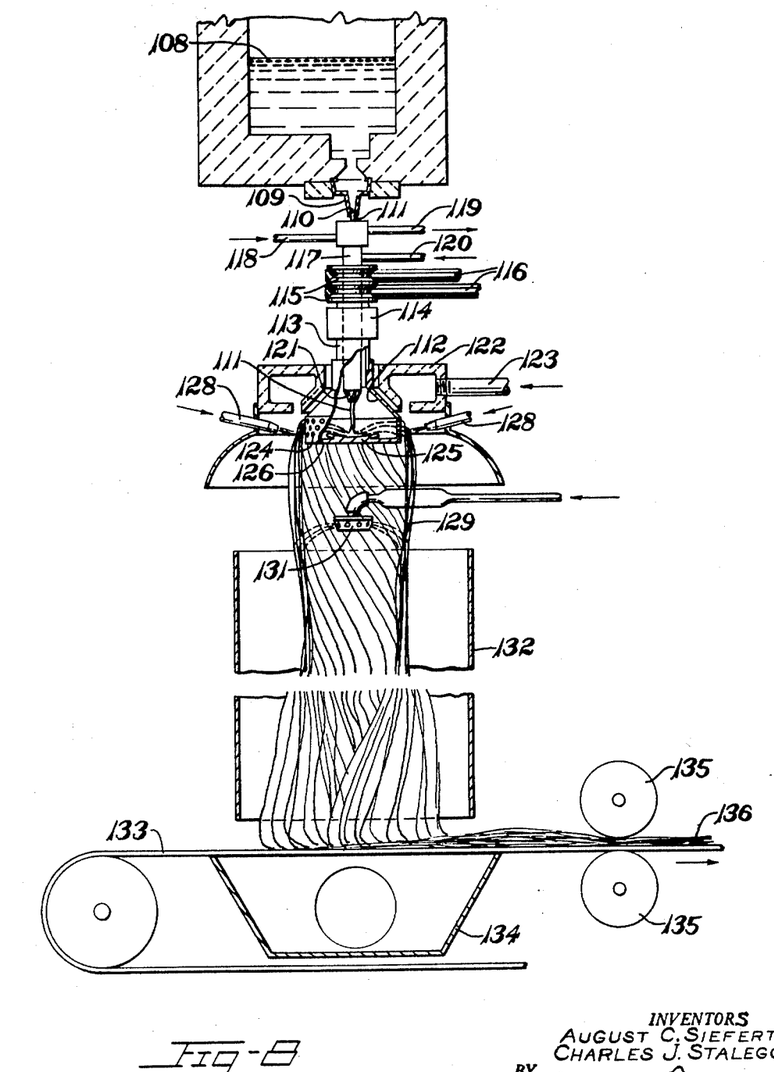
Figure 8 is an elevational view, parts being in section, of a centrifugal fiber forming process.

In Figure 8 a centrifugal fiber forming process is shown. A supply of molten glass 108 in a forehearth or a glass melter is directed through a feeder 109 having a single orifice 110 in the form of a stream 111 of molten glass. The stream of molten glass passes downwardly into a spinner 112 which is mounted upon shaft 113. The spinner 112 is rotatable upon bearings within housing 114. Shaft 113 is provided with driving sheaves 115, 115 which are coacting with drive belts 116, 116. Disposed within shaft 113 is an internal burner 117 which is hollow so that the stream of molten glass can pass downwardly therethrough and into the interior of spinner 112. The internal burner is provided with concentric chambers, the center one being for the passage of the stream 111 of molten glass, the next larger chamber being for the introduction of gas-air mixture and the outer one being a chamber for the passage of cooling water. The inlet 118 for the cooling water is a tube which passes to the bottom of the outer chamber of internal burner 117 and the water is discharged from outlet 119. Fuel-air mixture is introduced into the internal burner through inlet 120. The gas-air mixture burns as it leaves nozzle 121.

Disposed about spinner 112 is an annular burner 122 having an inlet 123 for gas-air mixture. The products of combustion from burner 122 pass downwardly about the outer periphery of spinner 112, a portion of the flame licking upon the outer edge of the spinner. Spinner 112 is provided with a perforated outer band 124 and a slinger plate 125. The bottom plate 126 of the spinner 112 is provided with several ports through which the products of combustion from internal burner 117 can escape, these ports not being shown. Disposed about the spinner 112 is a skirt 127 having nozzles 128, 128 adapted for the introduction of a gaseous substance into the attenuation zone.

When operating the centrifugal fiber forming apparatus, the molten glass is introduced into the spinner which is rotating at about 3,000 r.p.m. and the molten glass is thrown outwardly by centrifugal force and passes through the openings in perforated band 124. The internal burner is used only when starting the apparatus or when operating the apparatus at low production rates in order to maintain the desired temperature within the spinner. The fibers emitting from perforated band 124 pass into the blast from annular burner 122 with a result that the path of the fibers is turned downwardly at an angle of about 90° from the path they assume while passing through the orifices in the perforated band. They form a beam of fibers 129 which passes downwardly toward the collecting device. A binder applicator 131 applies binder to the fibers in the beam as they pass downwardly through hood 132. The beam of fibers is collected upon link belt conveyor 133 due to the action of suction box 134. A mat of fibers is collected and this product is advanced between compression rolls 135, 135 and the compressed mat 136 is rolled up for shipment.

In operating this apparatus a gas which lowers the surface tension of molten glass is mixed with the gas-air mixture introduced into annular burner 122. As an alternative method or as an added means of introducing a gas, such a gas or other substance is added into the attenuation zone by passing the gaseous substance or the like through nozzles 128, 128. Although this process normally provides long fibers of quite uniform diameter without the admission of a gas to change surface tension, it is possible to improve the characteristics of the fiber by controlling the surface tension and viscosity of the glass as it is being attenuated.

Figure 9:
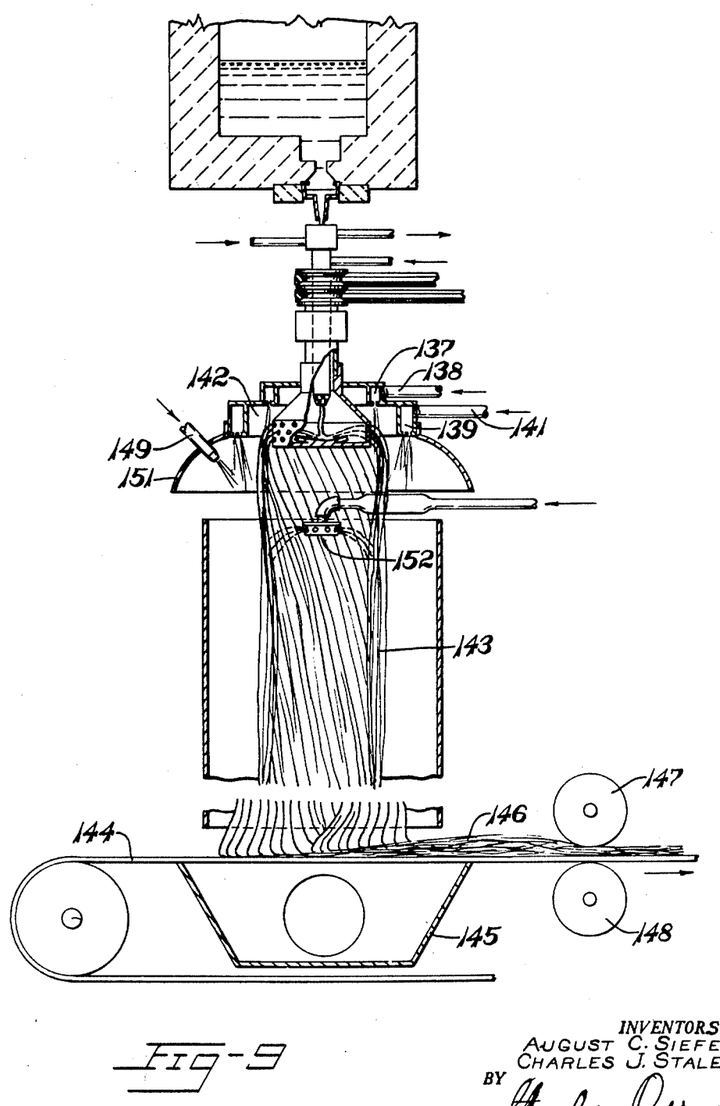
Figure 9 is a side elevational view, partly in section, of another embodiment of a centrifugal fiber forming process.

In Figure 9 is shown another centrifugal fiber forming apparatus most of the components being the same as in Figure 8 with the exception that instead of having an annular burner from which the combustion products emit, an annular nozzle 137 into which gas-air mixture is introduced through inlet 138 and a concentric annular air blower 139 having an inlet 141 are used. The molten glass primaries emitting from the perforated band of the spinner pass outwardly into the flame burning within open chamber 142 and a concentric blast of air emitting from annular air blower 139 adds to the attenuating force provided by the flame. A beam of fibers 143 passes downwardly and is collected upon conveyor 144 due to the action of suction box 145. The product is collected in a mat 146 upon conveyor 144 and is then directed between rolls 147, 148 to compress the mat into a final product.

A gaseous substance which reduces the surface tension of the molten glass being attenuated into fibers is introduced along with the air being directed into inlet 141 of annular air blower 139 or the gaseous substance is introduced through one or more nozzles 149 disposed in skirt 151. The gaseous substance is also directed into burner 137 if desired.

If desirable, a substance which controls the surface tension is introduced through both the annular air blower 141, the nozzle 149 and into burner 137. Products having improved physical properties are achieved by the use of the apparatus shown, and furthermore the process is improved in that increased production of uniform, fine diameter fiber is provided when control of the surface tension and viscosity of the molten glass is achieved. It will be noted that application of binder is made through a nozzle 152 inserted into the beam of fibers 143.

Figures 10, 12:
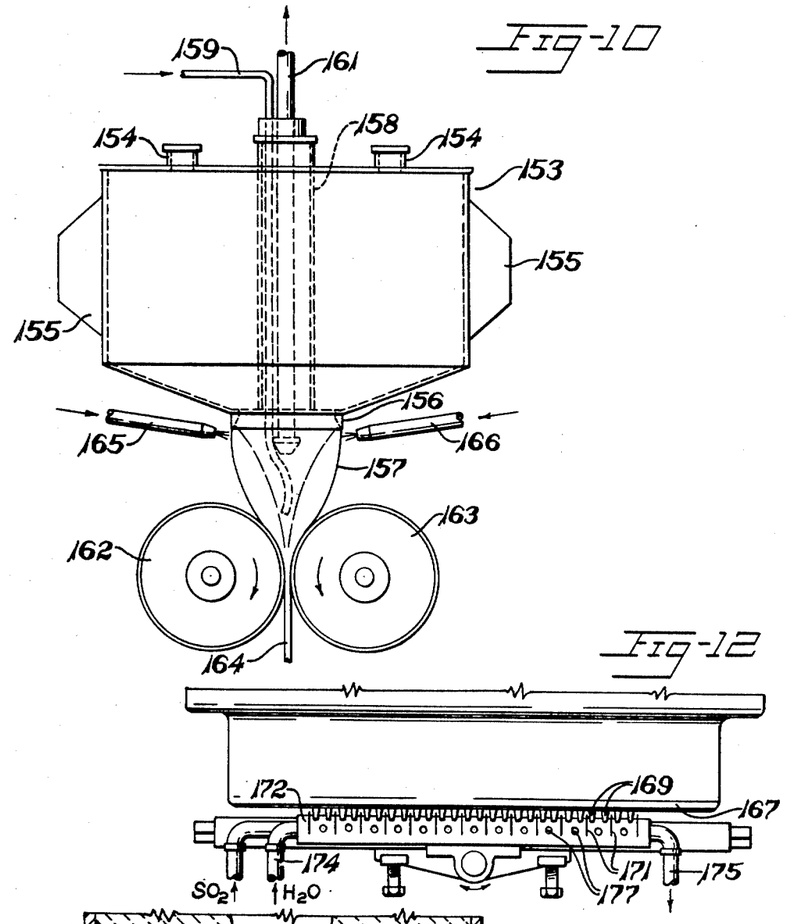
Figure 10 is a side elevational view of film glass producing apparatus.
Figure 12 is a front elevational view of the apparatus of Figure 11.

The invention is applicable also to methods and apparatus for producing film glass and in Figure 10 is shown apparatus for producing improved film glass products. A glass melter 153, adapted for melting glass marbles which are introduced through inlets 154, 154, is electrically heated. Terminals 155, 155 are connected to a suitable power source, not shown. In the bottom of the glass melter 153 is disposed annular feeder 156 through which molten glass flows to form a cylinder of glass 157. Glass melter 153 is provided with a cylindrical member 158 through which inlet and outlet tubes 159, 161, respectively, pass. A gaseous substance is introduced through inlet tube 159 under sufficient pressure to prevent the collapse of the cylinder of glass 157 as it passes downwardly from feeder 156 due to the action of rotating rolls 162, 163. An immediate collapse of the cylinder of glass 157 would result if no slight pressure were maintained within the cylinder of glass due to the admittance of a substance therein. As the cylinder of glass 157 is advanced between rolls 162, 163, the cylinder is collapsed and flattened to form a film of glass 164 which is collected by any suitable means. If desirable, the product is broken into flakes of glass which are collected upon a link belt conveyor having a suction box. Outlet tube 161 allows the gas or other substance admitted through inlet tube 159 to bleed off as the cylinder of glass is collapsed by the action of rolls 162, 163.

In carrying out the invention, it is advantageous to admit a substance which controls the surface tension and viscosity of the molten glass emitting from feeder 156. Such a substance is introduced through inlet tube 159 and/or through nozzles 165, 166. A cylinder of lesser wall thickness is formed when the surface tension of the molten glass is reduced by the introduction of a suitable substance about the plastic glass being attenuated. The substance which controls the surface tension and viscosity is introduced into the inside of the cylinder and also to the outside of the cylinder or, if desirable, the substance is added only to the inside of the cylinder or only to the outside of the cylinder.

If desirable, other materials are added through inlet tube 159 or through a separate inlet tube, not shown. For instance, in addition to the substance added to prevent collapse of the cylinder of glass, it is sometimes desirable to add materials such as thermoplastic and thermosetting resins, metal, sizing materials including film formers, coupling agents, lubricants, and the like, or combinations of these materials.

Figure 11:
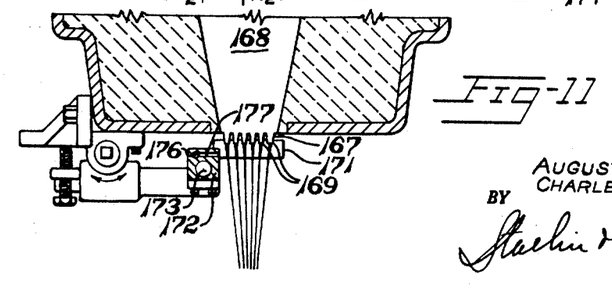
Figure 11 is a side elevational view of a feeder having fin coolers and a manifold for introducing a fluid between fins.

In Figures 11 and 12 is shown a feeder 167 adapted for forming a plurality of streams of molten glass from a supply of molten glass 168. The feeder comprising a plurality of tips 169 is especially adapted for use in producing continuous strand as with the apparatus shown in Figure 1. Between rows of tips 169 are disposed fins 171, 171 mounted on a manifold 172. Manifold 172 has a drilled passage 173 through which water is flowed as a coolant, the feeder inlet being designated by numeral 174 and the outlet by numeral 175. Manifold 172 also has a drilled passage 176 with which outlet ports 177, 177 are connected. Outlet ports 177, 177 are located between fins 171, 171 as shown in Figure 12.

In operating apparatus such as that shown, a substance which controls the surface tension and viscosity of the molten glass being attenuated is introduced through outlet ports 177, 177 into that chamber defined by adjacent fins 171, 171 and manifold 172. A gaseous substance is emitted from the outlet ports 177, 177 to fill the attenuation zone. A coolant is introduced through inlet 174 and is removed through outlet 175 to cool the fins 171, 171. Heat is removed from the attenuation zone by the fins 171, 171. Such a feeder and cooling fin arrangement may be used with any of the processes shown in Figures 1 to 10. The fin coolers are disclosed and claimed in an application having Serial Number 470,357, filed November 22, 1954 in the name of Robert G. Russell. Other suitable housings may surround the attenuation zone adjacent the feeder of any of the processes. For instance, a rectangular fence or wall may surround the entire tip section of the feeder instead of using the fin coolers of Figures 11 and 12 as the housing means.

In any of the processes described and shown in the drawings, it is advantageous to add a gaseous substance such as sulfur dioxide or fluorine to the atmosphere around the attenuation zone in order to reduce surface tension and viscosity of the glass being attenuated. The glass in an attenuable state is affected by the presence of such substances manifested in a reduction in surface tension and viscosity which facilitates attenuation of the glass and tends to reduce the production of "shot."

When using $SO_2$ as the gaseous substance for reducing surface tension of glass being drawn, it is desirable to use from 0.01 to 10% $SO_2$ by volume based on the total blowing or attenuating gases. Usually from about 0.01 to 5% of $SO_2$ is used. When $SO_2$ is to be used with a process using a blast from a burner, enough $SO_2$ is added to provide from 0.01 to 0.03% of $SO_2$ based on the total combustion products. When using steam as the attenuating force, the $SO_2$ is provided in sufficient amount so that it is up to 0.03% of the total steam and induced air being directed over streams of glass being attenuated. It has been found satisfactory to use 0.07% of $SO_2$ in the combustion gases of a process using a blast from a burner for the attenuating force. Long and silky fibers were produced when using such a concentration of $SO_2$.

One-half micron fibers formed with a burner blast having sulfur dioxide gas included therein were collected on a drum in the form of a web. These fibers were beaten in a paper beater and it was found they had to be beaten for twenty minutes as compared to three to five minutes for fibers produced without sulfur dioxide. The longer beating time required is a result of longer fibers being produced. The production rate of fibers was increased two to three times also. Any short fibers which are produced by a burner blast are caught by the long fibers and held; thus, the amount of "fly" is reduced. The fuels which are used with the burners include methane, butane, propane, and mixtures of these, natural gas, manufactured gas, alcohol, kerosene, gasoline, and the like. In continuous operations, the atmosphere is totally sulfur dioxide.

$SO_2$ is introduced in many ways. For instance, the $SO_2$ is bubbled through the glass to be formed into fibers or film glass such as is disclosed in Figure 4. Other substances that may be bubbled through the molten glass include in addition to $SO_2$, water and fluorine gas. $SO_2$ or fluorine or water can be bubbled into the molten glass to be used in any of the processes disclosed to reduce surface tension and viscosity of the glass. Improved attenuation and improved products are attained by introducing these substances into the molten glass immediately prior to drawing out the glass into film or fibrous form.

Fibrous glass and film glass produced according to the disclosed methods are used in many ways. The fibers and film are used in textile products, for reinforcement of resins, cements, metals, and the like, in building insulation, in aircraft insulation, as dunnage material, in shock pads, in paper making processes, and in many other ways where their special properties are advantageously utilized.

Binders, sizes, and after treatments are applied to the products of this invention to enhance their properties and to prepare them for coupling with resins, metals, rubbers, and the like. It is desirable in some instances to neutralize the surface acidity of the fibers caused by the use of sulfur dioxide. Ammonium hydroxide is used to neutralize such acidity and then the desired binder or coating is applied. The binders and sizes include thermosetting and thermoplastic resins, latices, starch, gelatine, silicones, and the like or combinations of these materials.

The invention includes various modifications and variations within the spirit and scope of the appended claims.

We claim:

1. Improved method of producing drawn out glass fibers comprising flowing a plurality of streams of molten glass from a supply thereof, applying an attenuating force to said streams to form drawn out glass fibers, and providing about said streams an atmosphere comprising sulfur dioxide gas to reduce the surface tension and viscosity of the glass in said streams to produce very fine diameter fibers at increased production rates.

2. In a method of producing fine diameter, smooth, uniform, shot-free glass fibers from a molten bath of glass comprising flowing streams of molten glass from a supply thereof and attenuating the streams into fibers, the improvement comprising introducing sulfur dioxide into the atmosphere about said streams of molten glass to reduce the surface tension of the glass as the streams are attenuated.

3. In a method of producing fibers by attenuating flowable streams of molten glass, the improvement comprising intimately mixing sulfur dioxide gas with the molten glass in the streams being attenuated to lower the surface tension of the molten glass as it flows in the form of a stream, thereby forming improved fibers.

References Cited in the file of this patent

UNITED STATES PATENTS

| 1,782,169 | Kamita | Nov. 18, 1930 |
| 2,154,490 | Burch | Apr. 18, 1939 |
| 2,184,320 | Simpson | Dec. 26, 1939 |
| 2,254,079 | McAlpine | Aug. 26, 1941 |
| 2,331,052 | Shadduck | Oct. 5, 1943 |

FOREIGN PATENTS

| 849,842 | France | Aug. 28, 1939 |
| 849,843 | France | Aug. 28, 1939 |